(12) United States Patent
Bose et al.

(10) Patent No.: US 8,271,765 B2
(45) Date of Patent: Sep. 18, 2012

(54) MANAGING INSTRUCTIONS FOR MORE EFFICIENT LOAD/STORE UNIT USAGE

(75) Inventors: Pradip Bose, Yorktown Heights, NY (US); Alper Buyuktosunoglu, White Plains, NY (US); Michael Stephen Floyd, Cedar Park, TX (US); Dung Quoc Nguyen, Austin, TX (US); Bruce Joseph Ronchetti, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 726 days.

(21) Appl. No.: 12/420,143

(22) Filed: Apr. 8, 2009

(65) Prior Publication Data

US 2010/0262808 A1    Oct. 14, 2010

(51) Int. Cl.
G06F 9/00    (2006.01)
(52) U.S. Cl. ........................................ 712/214; 712/216
(58) Field of Classification Search .................. 712/214, 712/216, 220
See application file for complete search history.

(56) References Cited

U.S. PATENT DOCUMENTS

| | | | | |
|---|---|---|---|---|
| 3,934,131 A | * | 1/1976 | Perschy | 714/55 |
| 5,941,983 A | * | 8/1999 | Gupta et al. | 712/214 |
| 5,958,041 A | * | 9/1999 | Petolino et al. | 712/214 |
| 6,016,540 A | * | 1/2000 | Zaidi et al. | 712/214 |
| 6,237,081 B1 | * | 5/2001 | Le et al. | 712/214 |
| 6,880,074 B2 | | 4/2005 | Perry et al. | |
| 6,912,648 B2 | * | 6/2005 | Hammarlund et al. | 712/219 |
| 6,978,360 B2 | * | 12/2005 | Bilardi et al. | 712/225 |
| 7,152,155 B2 | * | 12/2006 | McIlvaine et al. | 712/239 |
| 7,254,697 B2 | | 8/2007 | Bishop et al. | |
| 7,366,877 B2 | * | 4/2008 | Augsburg et al. | 712/214 |
| 2003/0126406 A1 | * | 7/2003 | Hammarlund et al. | 712/200 |
| 2006/0020910 A1 | * | 1/2006 | Schlanger et al. | 717/101 |
| 2006/0095732 A1 | * | 5/2006 | Tran et al. | 712/217 |
| 2007/0294489 A1 | | 12/2007 | Brenner | |

* cited by examiner

Primary Examiner — Aimee Li
(74) Attorney, Agent, or Firm — Yee & Associates, P.C.

(57) ABSTRACT

The illustrative embodiments described herein provide a computer-implemented method, apparatus, and a system for managing instructions. A load/store unit receives a first instruction at a port. The load/store unit rejects the first instruction in response to determining that the first instruction has a first reject condition. Then, the instruction sequencing unit activates a first bit in response to the load/store unit rejection the first instruction. The instruction sequencing unit blocks the first instruction from reissue while the first bit is activated. The processor unit determines a class of rejection of the first instruction. The instruction sequencing unit starts a timer. The length of the timer is based on the class of rejection of the first instruction. The instruction sequencing unit resets the first bit in response to the timer expiring. The instruction sequencing unit allows the first instruction to become eligible for reissue in response to resetting the first bit.

13 Claims, 4 Drawing Sheets

US 8,271,765 B2

MANAGING INSTRUCTIONS FOR MORE EFFICIENT LOAD/STORE UNIT USAGE

This invention was made with United States Government support under Agreement No. HR0011-07-9-0002 awarded by Defense Advanced Research Projects Agency (DARPA). THE GOVERNMENT HAS CERTAIN RIGHTS IN THE INVENTION.

BACKGROUND

1. Field

The present disclosure relates generally to an improved data processing system and more specifically to managing instructions. Still more particularly, the present disclosure relates to blocking instructions from a load/store unit.

2. Description of the Related Art

A computer contains many parts. One of the main components of a computer is the processor or central processing unit. Most central processing units are now microprocessors. The microprocessor executes sets of instructions. The sets of instructions are programs. The data that makes up the instructions is contained on the memory of a computer. To have quicker access to the data, a microprocessor typically contains its own register used to store data. A load/store unit moves data in between the register and memory.

The load/store unit detects several conditions in which cause it to reject an instruction on a port. A rejected instruction is usually reissued after at least a couple of cycles. When reissued, the rejected instruction is likely to be rejected again before it finally completes. Therefore, a substantial amount of power is wasted without providing any real benefit.

SUMMARY

The illustrative embodiments described herein provide a computer-implemented method, apparatus, and a system for managing instructions. A load/store unit receives a first instruction at a port. The load/store unit rejects the first instruction in response to determining that the first instruction has a first reject condition. Then, the instruction sequencing unit activates a first bit in response to the load/store unit rejection the first instruction. The instruction sequencing unit blocks the first instruction from reissue while the first bit is activated. The processor unit determines a class of rejection of the first instruction. The instruction sequencing unit starts a timer. The length of the timer is based on the class of rejection of the first instruction. The instruction sequencing unit resets the first bit in response to the timer expiring. The instruction sequencing unit allows the first instruction to become eligible for reissue in response to resetting the first bit.

DETAILED DESCRIPTION

Figure 1:
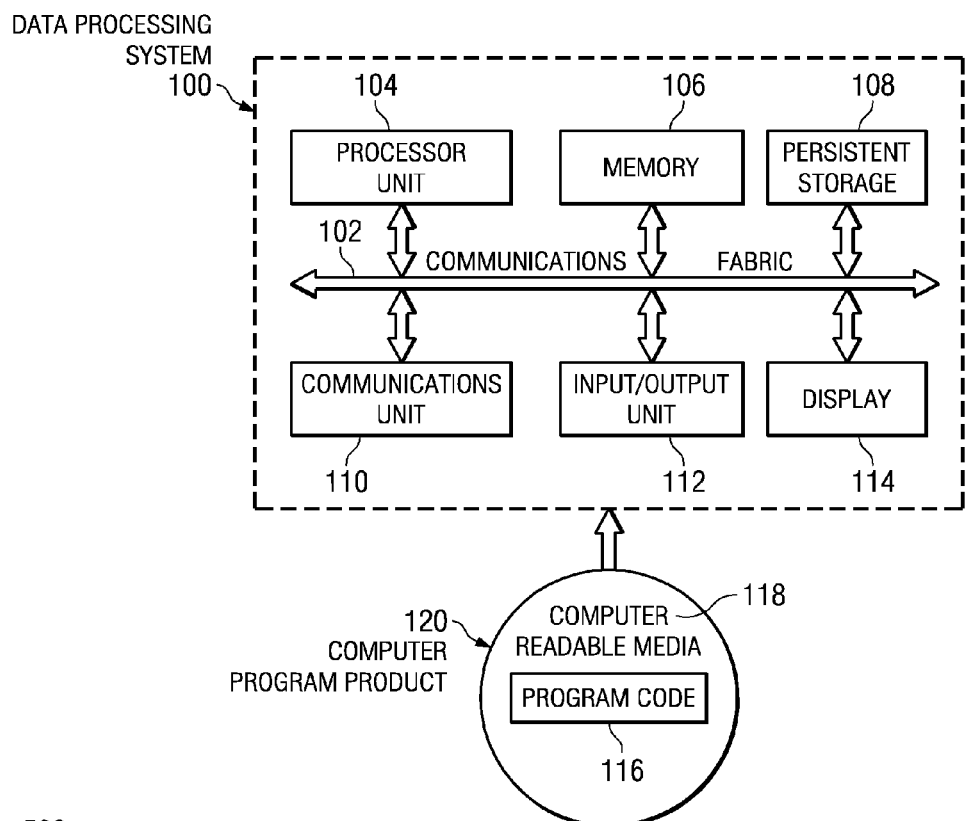
FIG. 1 is a diagram of a data processing system, in which the illustrative embodiments of the present invention may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The illustrative embodiments described herein provide a computer-implemented method, apparatus, and a system for managing instructions. A load/store unit receives a first instruction at a port. The load/store unit determines a first condition of the first instruction. Then, in response to a first determination that the first condition is a first reject class condition, the load/store unit rejects the first instruction. Then, the instruction sequencing unit activates a first bit in response to the load/store unit rejecting the first instruction. While the first bit is activated, the first instruction is blocked from reissue.

Next, the instruction sequencing unit starts a counter in response to the load/store unit rejecting the first instruction. Then, the instruction sequencing unit determines whether the counter is expired. The instruction sequencing unit resets the first bit in response to the counter expiring. Afterwards, the instruction sequencing unit allows the first instruction to become eligible for reissue in response to resetting the first bit.

One advantage to the illustrative embodiments described herein is the conservation of power. The illustrative embodiments conserve power by blocking unnecessary reissue of instructions.

Turning now to FIG. 1, a diagram of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices. A storage device is any piece of hardware that is capable of storing information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 116 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 116 may be a server computer, a client computer, or some other device capable of storing and transmitting program code 116.

The different components illustrated for data processing system 100 are not meant to provide architectural limitations to the manner in which different embodiments may be implemented. The different illustrative embodiments may be implemented in a data processing system including components in addition to, or in place of, those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache, such as found in an interface and memory controller hub that may be present in communications fabric 102.

Figure 2:
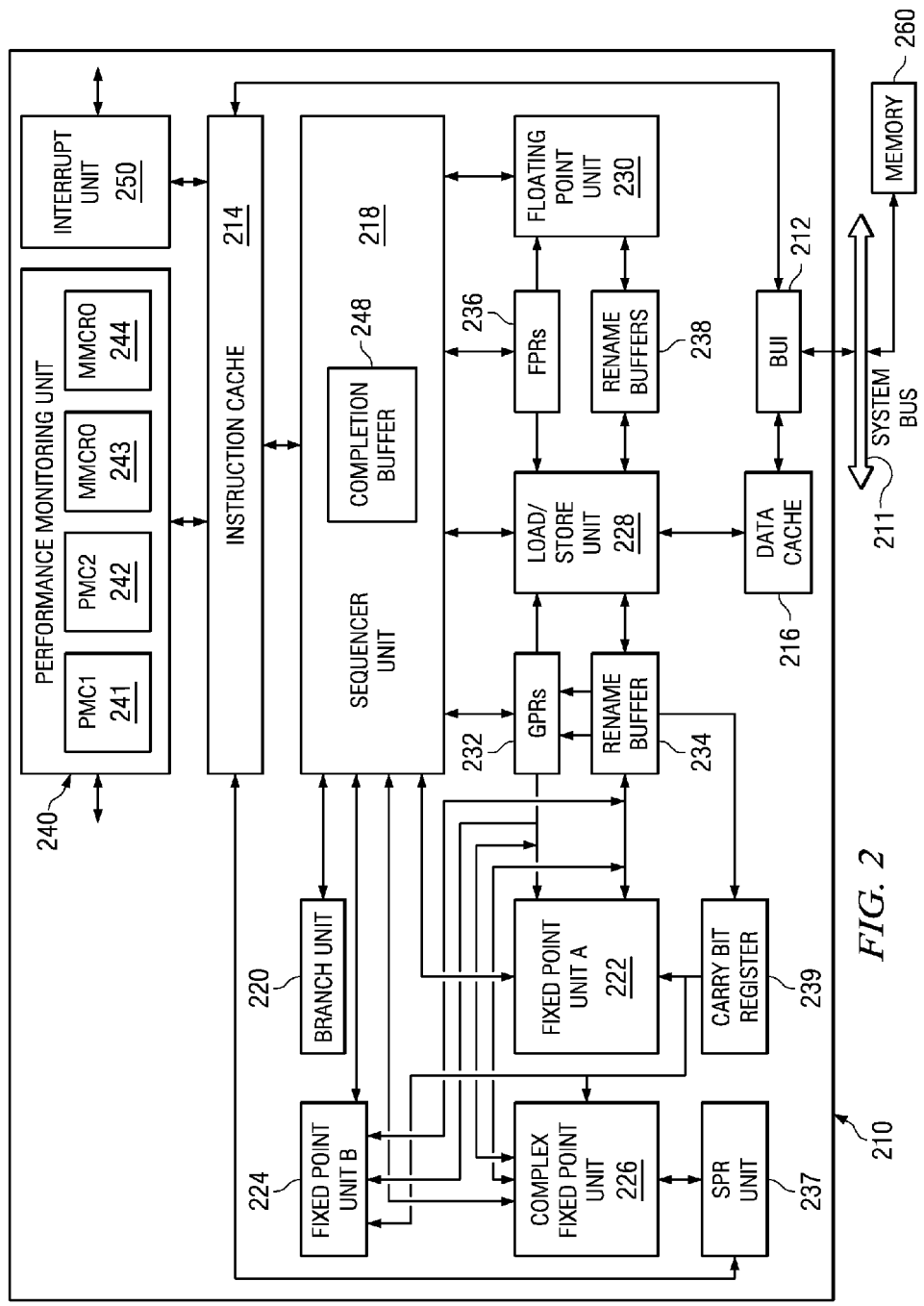
FIG. 2 is a block diagram of a processor system for processing information, in which the illustrative embodiments of the present invention may be implemented.

FIG. 2 is a block diagram of a processor system for processing information, in which the illustrative embodiments of the present invention may be implemented. Processor 210 may be implemented as processor unit 104 in FIG. 1.

In an illustrative embodiment, processor 210 is a single integrated circuit superscalar microprocessor. Accordingly, as discussed further herein below, processor 210 includes various units, registers, buffers, memories, and other sections, all of which are formed by integrated circuitry. Also, in the illustrative embodiment, processor 210 operates according to reduced instruction set computer ("RISC") techniques. As shown in FIG. 2, system bus 211 is connected to a bus interface unit ("BUI") 212 of processor 210. BUI 212 controls the transfer of information between processor 210 and system bus 211.

BUI 212 is connected to an instruction cache 214 and to data cache 216 of processor 210. Instruction cache 214 outputs instructions to sequencer unit 218. In response to such instructions from instruction cache 214, sequencer unit 218 selectively outputs instructions to other execution circuitry of processor 210.

In addition to sequencer unit 218, in the illustrative embodiment, the execution circuitry of processor 210 includes multiple execution units, namely a branch unit 220, a fixed-point unit A ("FXUA") 222, a fixed-point unit B ("FXUB") 224, a complex fixed-point unit ("CFXU") 226, a load/store unit ("LSU") 228, and a floating-point unit ("FPU") 230. FXUA 222, FXUB 224, CFXU 226, and LSU 228 input their source operand information from general-purpose architectural registers ("GPRs") 232 and fixed-point rename buffers 234. Moreover, FXUA 222 and FXUB 224 input a "carry bit" from a carry bit ("CA") register 239. FXUA 222, FXUB 224, CFXU 226, and LSU 228 output results (destination operand information) of their operations for storage at selected entries in fixed-point rename buffers 234. Also, CFXU 226 inputs and outputs source operand information and destination operand information to and from special-purpose register processing unit ("SPR unit") 237.

FPU 230 inputs its source operand information from floating-point architectural registers ("FPRs") 236 and floating-point rename buffers 238. FPU 230 outputs results (destination operand information) of its operation for storage at selected entries in floating-point rename buffers 238.

In response to a load instruction, LSU 228 inputs information from data cache 216 and copies such information to selected rename buffers 234 and 238. If such information is not stored in data cache 216, then data cache 216 inputs (through BUI 212 and system bus 211) such information from a system memory 260 connected to system bus 211. Moreover, data cache 216 is able to output (through BUI 212 and system bus 211) information from data cache 216 to system memory 260 connected to system bus 211. In response to a store instruction, LSU 228 inputs information from a selected one of GPRs 232 and FPRs 236 and copies such information to data cache 216.

Sequencer unit 218 inputs and outputs information to and from GPRs 232 and FPRs 236. From sequencer unit 218, branch unit 220 inputs instructions and signals indicating a present state of processor 210. In response to such instructions and signals, branch unit 220 outputs (to sequencer unit 218) signals indicating suitable memory addresses storing a sequence of instructions for execution by processor 210. In response to such signals from branch unit 220, sequencer unit 218 inputs the indicated sequence of instructions from instruction cache 214. If one or more of the sequence of instructions is not stored in instruction cache 214, then instruction cache 214 inputs (through BUI 212 and system bus 211) such instructions from system memory 260 connected to system bus 211.

In response to the instructions input from instruction cache 214, sequencer unit 218 selectively dispatches the instructions to selected ones of execution units 220, 222, 224, 226, 228, and 230. Each execution unit executes one or more instructions of a particular class of instructions. For example, FXUA 222 and FXUB 224 execute a first class of fixed-point mathematical operations on source operands, such as addition, subtraction, ANDing, ORing and XORing. CFXU 226 executes a second class of fixed-point operations on source operands, such as fixed-point multiplication and division. FPU 230 executes floating-point operations on source operands, such as floating-point multiplication and division.

As information is stored at a selected one of rename buffers 234, such information is associated with a storage location (e.g. one of GPRs 232 or carry bit (CA) register 239) as specified by the instruction for which the selected rename buffer is allocated. Information stored at a selected one of rename buffers 234 is copied to its associated one of GPRs 232 (or CA register 239) in response to signals from sequencer unit 218. Sequencer unit 218 directs such copying of information stored at a selected one of rename buffers 234 in response to "completing" the instruction that generated the information. Such copying is called "writeback."

As information is stored at a selected one of rename buffers 238, such information is associated with one of FPRs 236. Information stored at a selected one of rename buffers 238 is copied to its associated one of FPRs 236 in response to signals from sequencer unit 218. Sequencer unit 218 directs such copying of information stored at a selected one of rename buffers 238 in response to "completing" the instruction that generated the information.

Processor 210 achieves high performance by processing multiple instructions simultaneously at various ones of execution units 220, 222, 224, 226, 228, and 230. Accordingly, each instruction is processed as a sequence of stages, each being executable in parallel with stages of other instructions. Such a technique is called "pipelining." In a significant aspect of the illustrative embodiment, an instruction is normally processed as six stages, namely fetch, decode, dispatch, execute, completion, and writeback.

In the fetch stage, sequencer unit 218 selectively inputs (from instruction cache 214) one or more instructions from one or more memory addresses storing the sequence of instructions discussed further hereinabove in connection with branch unit 220, and sequencer unit 218. In the decode stage, sequencer unit 218 decodes up to four fetched instructions.

In the dispatch stage, sequencer unit 218 selectively dispatches up to four decoded instructions to selected (in response to the decoding in the decode stage) ones of execution units 220, 222, 224, 226, 228, and 230 after reserving rename buffer entries for the dispatched instructions' results (destination operand information). In the dispatch stage, operand information is supplied to the selected execution units for dispatched instructions. Processor 210 dispatches instructions in order of their programmed sequence.

In the execute stage, execution units execute their dispatched instructions and output results (destination operand information) of their operations for storage at selected entries in rename buffers 234 and rename buffers 238 as discussed further hereinabove. In this manner, processor 210 is able to execute instructions out-of-order relative to their programmed sequence.

In the completion stage, sequencer unit 218 indicates an instruction is "complete." Processor 210 "completes" instructions in order of their programmed sequence.

In the writeback stage, sequencer 218 directs the copying of information from rename buffers 234 and 238 to GPRs 232 and FPRs 236, respectively. Sequencer unit 218 directs such copying of information stored at a selected rename buffer. Likewise, in the writeback stage of a particular instruction, processor 210 updates its architectural states in response to the particular instruction. Processor 210 processes the respective "writeback" stages of instructions in order of their programmed sequence. Processor 210 advantageously merges an instruction's completion stage and writeback stage in specified situations.

In the illustrative embodiment, each instruction requires one machine cycle to complete each of the stages of instruction processing. Nevertheless, some instructions (e.g., complex fixed-point instructions executed by CFXU 226) may require more than one cycle. Accordingly, a variable delay may occur between a particular instruction's execution and completion stages in response to the variation in time required for completion of preceding instructions.

Completion buffer 248 is provided within sequencer 218 to track the completion of the multiple instructions which are being executed within the execution units. Upon an indication that an instruction or a group of instructions have been completed successfully, in an application specified sequential order, completion buffer 248 may be utilized to initiate the transfer of the results of those completed instructions to the associated general-purpose registers.

In addition, processor 210 also includes performance monitor unit 240, which is connected to instruction cache 214 as well as other units in processor 210. Operation of processor 210 can be monitored utilizing performance monitor unit 240, which in this illustrative embodiment is a software-accessible mechanism capable of providing detailed information descriptive of the utilization of instruction execution resources and storage control. Although not illustrated in FIG. 2, performance monitor unit 240 is coupled to each functional unit of processor 210 to permit the monitoring of all aspects of the operation of processor 210, including, for example, reconstructing the relationship between events, identifying false triggering, identifying performance bottlenecks, monitoring pipeline stalls, monitoring idle processor cycles, determining dispatch efficiency, determining branch efficiency, determining the performance penalty of misaligned data accesses, identifying the frequency of execution of serialization instructions, identifying inhibited interrupts, and determining performance efficiency. The events of interest also may include, for example, time for instruction decode, execution of instructions, branch events, cache misses, and cache hits.

Performance monitor unit 240 includes an implementation-dependent number (e.g., 2-8) of counters 241-242, labeled PMC1 and PMC2, which are utilized to count occurrences of selected events. Performance monitor unit 240 further includes at least one monitor mode control register (MMCR). In this example, two control registers, MMCRs 243 and 244 are present that specify the function of counters 241-242. Counters 241-242 and MMCRs 243-244 are preferably implemented as SPRs that are accessible for read or write via MFSPR (move from SPR) and MTSPR (move to SPR) instructions executable by CFXU 226. However, in one alternative embodiment, counters 241-242 and MMCRs 243-244 may be implemented simply as addresses in I/O space. In another alternative embodiment, the control registers and counters may be accessed indirectly via an index register. This embodiment is implemented in the IA-64 architecture in processors from Intel Corporation.

The various components within performance monitoring unit 240 may be used to generate data for performance analysis. Depending on the particular implementation, the different components may be used to generate trace data. In other illustrative embodiments, performance unit 240 may provide data for time profiling with support for dynamic address to name resolution.

Additionally, processor 210 also includes interrupt unit 250, which is connected to instruction cache 214. Additionally, although not shown in FIG. 2, interrupt unit 250 is connected to other functional units within processor 210. Interrupt unit 250 may receive signals from other functional units and initiate an action, such as starting an error handling or trap process. In these examples, interrupt unit 250 is employed to generate interrupts and exceptions that may occur during execution of a program.

The instruction sequencing unit determines a class of rejection of the first instruction. Then, the instruction sequencing unit starts a timer in the instruction sequencing unit. Next, a second instruction is received at a port of the load/store unit. Once the instruction is received, the load/store unit rejects the second instruction in response to determining that the second instruction has a second reject condition. The instruction sequencing unit then activates a second bit in response to the load/store unit rejecting the second instruction.

While the second bit is activated, the instruction sequencing unit blocks the second instruction from reissue. Then, the first bit is reset in response to the timer expiring, wherein the class of rejection for the second instruction is the same class of rejection as the first instruction. In response to the first bit and the second bit being reset, the instruction sequencing unit reissues the first instruction and second instruction.

Figure 3:
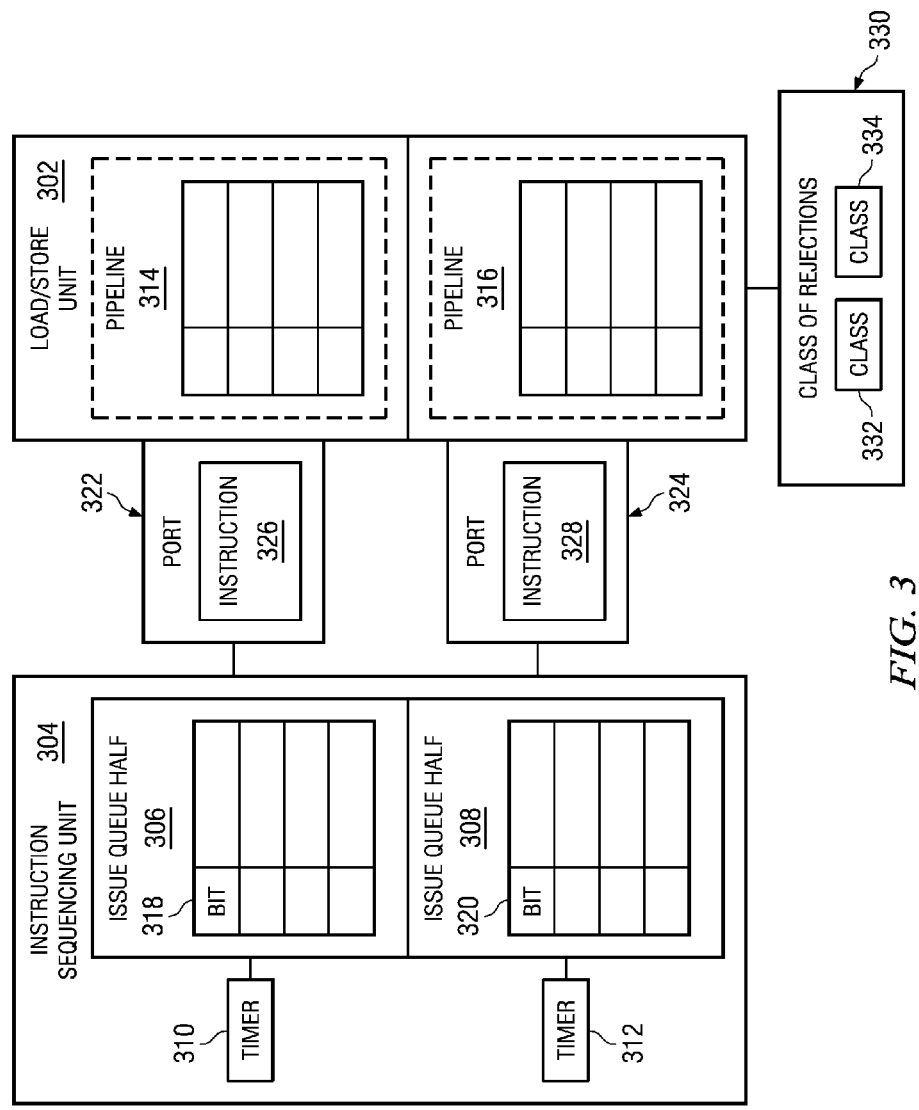
FIG. 3 is a block diagram of a load/store unit and an instruction sequencing unit, in which the illustrative embodiments of the present invention may be implemented.

FIG. 3 is a block diagram of a load/store unit (LSU) 302 and an instruction sequencing unit (ISU) 304, in which the illustrative embodiments of the present invention may be implemented. Load/store unit 302 may be implemented as load/store unit 228 in FIG. 2. Instruction sequencing unit 304 may be implemented as instruction sequencing unit 218 in FIG. 2.

Load/store unit 302 may be split into two pipelines 314 and 316. Each pipeline 314 and 316 contains a queue of instructions to be loaded or stored. Load/store unit 302 may receive instruction 326 and/or 328 from instruction sequencing unit 304 at port 322 or 324. There may be one port for each pipeline or one port for the entire load/store unit 302. Load/store unit 302 determines the condition of instruction 326. Instruction 326 may be completed or rejected. If instruction 326 is rejected, instruction 326 will be sent back to instruction sequencing unit 304.

In computer science, instruction 326 is a single operation of a processor defined by an instruction set architecture. In a broader sense, an "instruction" may be any representation of an element of an executable program, such as a bytecode. On traditional architectures, instruction 326 may include an opcode specifying the operation to be performed, such as "add contents of memory to register", and zero or more operand specifiers, which may specify registers, memory locations, or literal data. The operand specifiers may have addressing modes determining their meaning or may be in fixed fields.

Instruction sequencing unit 304 outputs instructions to different execution units such as load/store unit 302. If instruction sequencing unit 304 receives a rejected instruction 326 back from load/store unit 302, instruction sequencing unit 304 will activate a bit 318 or 320 in issue queue half 306 or 308. Bits 318 or 320 may be stored in sequencer unit 218, instruction cache 214, data cache 216, and/or memory 260, as shown in FIG. 2. Activating a bit may be defined as changing the value of the bit. If the instruction is the first instruction currently rejected for a class of rejection such as class of rejection 332, the instruction sequencing unit 304 starts whichever timer 310 or 312 is associated with the issue queue half 306 or 308 that the instruction is located in. A timer as used herein may be any type of timer. The term "timer" as used herein may be interchangeable with the term "counter." While timer 310 or 312 has not expired, the instruction is blocked from reissue to load/store unit 302. Once timer 310 or 312 has expired, the bit for each instruction 326 is reset and all of the instructions are allowed to become eligible for reissue to load/store unit 302.

When each instruction becomes eligible for reissue, the instruction sequencing unit 304 may choose which instructions to reissue first based on issue rules. One instruction may be reissued per clock cycle per port 322 or 324.

Since there is more than one counter, a new counter may be used for each class of rejection 332 and 334 that occurs simultaneously with a different class of rejection 332 and 334 in classes of rejections 330. Timer 310 and 312 may be set to count for clock cycles of 16, 32, 64, or other values. The amount of clock cycles is associated with class of rejection 332 and/or 334. For example, class of rejection 332 may be associated with a 16 clock cycle count.

The instruction sequencing unit 304 contains an issue queue. The issue queue is split into halves. Each half of the issue queue is associated with each of its own counter. Issue queue halves 306 and 308 are contained within the instruction sequencing unit. Each issue queue half 306 and 308 contain instruction entries waiting to be sent to an execution unit such as load/store unit 302.

The one or more illustrative embodiments in FIGS. 1-3 are not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, there may be more than one load/store unit than just load/store unit 228 or load/store unit 302 in FIGS. 2-3. There may be more instruction sequencing units than instruction sequencing unit 304. There may be multiple instruction sequencing units and load/store units on multiple processor units.

Figures 4, 6:
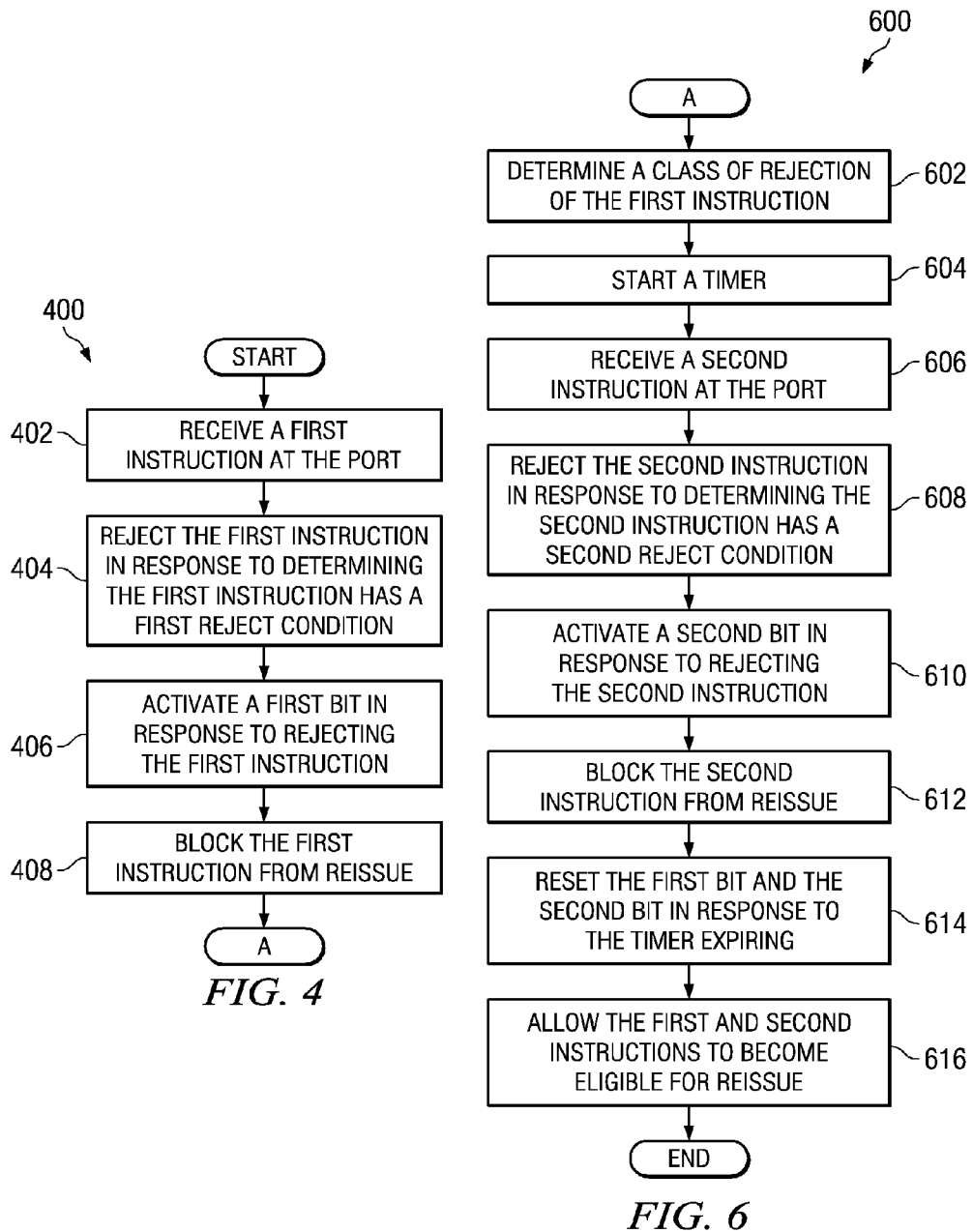
FIG. 4 is a flowchart describing a process for blocking a rejected instruction from reissue to a load/store unit, in accordance with an illustrative embodiment of the present invention.
FIG. 6 is a flowchart describing a process for blocking and reissuing a rejected instruction, in accordance with an illustrative embodiment of the present invention.

FIG. 4 is a flowchart describing a process for blocking a rejected instruction from reissue to a load/store unit, in accordance with an illustrative embodiment of the present invention. Process 400 may occur on the load/store unit 302 and the Instruction Sequencing Unit 304 of FIG. 3.

The process begins when a first instruction is received at a port of the load/store unit (step 402). Once the instruction is received, the load/store unit rejects the first instruction in response to determining that the first instruction has a first reject condition (step 404). The condition may be of any type of condition determinable by a load/store unit. A reject condition is a reason for rejection of an instruction that is received at the load/store unit and is rejected. Alternatively, the condition may be of the type that allows the instruction to be accepted. Then, the instruction sequencing unit activates a first bit in response to the load/store unit rejecting the first instruction (step 406). Activating the first bit may be changing the value of the first bit. The first bit may be associated with the first instruction.

While the first bit is activated, the instruction sequencing unit blocks the first instruction from reissue (step 408). The instruction is held in an issue queue half until the first bit is reset. The process can terminate thereafter. Alternatively, the process may be followed by process 500 or process 600.

Figure 5:
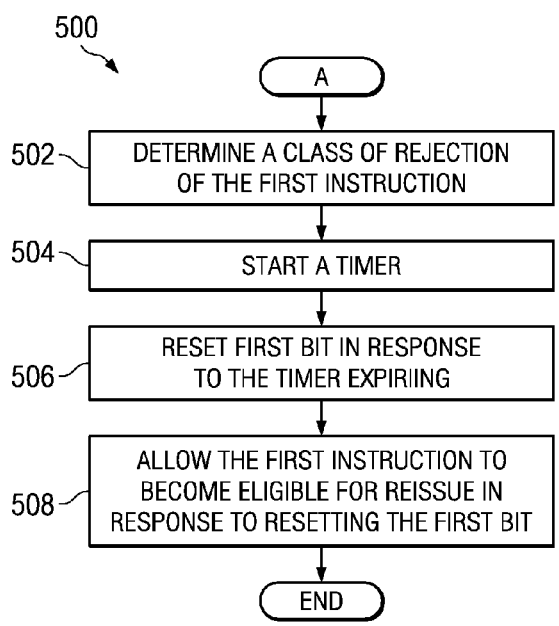
FIG. 5 is a flowchart describing a process for reissuing a blocked instruction to a load/store unit, in accordance with an illustrative embodiment of the present invention.

FIG. 5 is a flowchart describing a process for reissuing a blocked instruction to a load/store unit, in accordance with an illustrative embodiment of the present invention. Process 500 may occur on the load/store unit 302 and the Instruction Sequencing Unit 304 of FIG. 3.

The instruction sequencing unit determines a class of rejection of the first instruction (step 502). A class of rejection is a class that a rejection is part of based on the number of clock cycles it takes for the load/store unit to become ready to accept an instruction which was rejected under a certain type of rejection. For example, the rejection may be a part of a 16 clock cycle class if an instruction is rejected under a load-hitmiss rejection and a load/store unit normally takes up to 16 clock cycles to become ready to accept a load-hit-miss rejection. The class of rejections can be arranged in a variety of ways. For example, rejection which the load/store unit normally takes 17-32 clock cycles to accept may be in the 32 clock cycle rejection. The number of clock cycles is based on the type of rejection, or reject condition. Multiple types of rejection or reject conditions may fall under one class of rejection. The rejected instruction could be, for example, a load-hit-store. A load-hit-store occurs when the processor writes data to an address and then tries to load that data from the address again too soon afterwards. The instruction will not be ready for reissue for a period of time. The class of rejection of an instruction is based on the period of time an instruction must wait before it may reissue. For example, when a load-hit-store takes 20 clock cycles before the instruction can be ready for reissue, the load-hit-store may be a 16 clock cycle class of rejection. The time periods assigned to the different classes of rejections may be 16, 32, and 64 clock cycles, though other clock cycles could be used. There may be multiple types of reject conditions that fall under the 16 clock cycle class of rejection, multiple that fall under the 32 clock cycle class of rejection, and others that fall under the 64 clock cycle class of rejection.

A class of rejection may contain a number of conditions rejected for different reasons. The instruction may be rejected for any type of rejection typical of a load/store unit. For example, the instruction may be a partial load-hit-store. Normally, a load-hit-store contains an address and data. A partial load-hit-store may occur when not all of the data is present, none of the data is present, or the address is incorrect.

Next, the instruction sequencing unit starts a timer (step 504). The timer may be a counter. The timer and/or counter may be associated with the issue queue half where the blocked instruction entry from step 412 of FIG. 4 is located. The counter may be set to count for 16, 32, or 64 clock cycles, or for some other interval.

Next, the instruction sequencing unit resets the first bit in response to the counter expiring (step 506). The counter has expired after the counter has counted for the number of clock cycles, for which the counter was set.

Then, the first instruction becomes eligible for reissue in response to the instruction sequencing unit resetting the first bit (step 508). The process terminates thereafter.

FIG. 6 is a flowchart describing a process for blocking and reissuing a rejected instruction, in accordance with an illustrative embodiment of the present invention. Process 600 may occur on processor 210 of FIG. 2. Process 600 begins where process 400 ends. Process 600 is an illustrative embodiment when there is a second instruction received by the load/store unit while the counter has not yet expired. Process 600 may occur on the load/store unit 302 and the Instruction Sequencing Unit 304 of FIG. 3.

The instruction sequencing unit determines a class of rejection of the first instruction (step 602). The instruction sequencing unit starts a timer in the instruction sequencing unit (step 604). Next, a second instruction is received at a port of the load/store unit (step 606). Once the instruction is received, the load/store unit rejects the second instruction in response to determining that the second instruction has a second reject condition (step 608). The condition may be of any type of reject condition determinable by the load/store unit. The instruction sequencing unit activates a second bit in response to the load/store unit rejecting the second instruction (step 610).

While the second bit is activated, the instruction sequencing unit blocks the second instruction from reissue (step 612). Then, the first bit is reset in response to the timer expiring, wherein the class of rejection for the second instruction is the same class of rejection as the first instruction (step 614). The second instruction is held in an issue queue half until the bit is reset. In an alternative illustrative embodiment, the class of rejection for the second instruction would be different than the class of rejection of the first instruction. In that illustrative embodiment, the second bit would not be reset, only the first bit would be reset. The second instruction would be in a different class of rejection and would therefore have its own timer.

In response to the first bit and the second bit being reset, the instruction sequencing unit reissues the first instruction and second instruction (step 616). The process terminates thereafter.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

For example, the load/store unit and the instruction sequencing unit may be located on or off of the processor. There also may be multiple processors or multiple cores on a single processor.

The illustrative embodiments provide increased performance for a processor. The load/store unit sometimes cannot accept an instruction and must reject the instruction. Normally, the rejected instruction reissues as soon as possible, but the load/store unit may not be ready for the instruction yet. The illustrative embodiments provide for blocking the instruction from reissue to allow the load/store unit time to become ready to accept the instruction allowing for a decrease in the processing power that is wasted on reissued instructions which would not have been accepted.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention may take the form of an entirely hardware embodiment, an entirely software embodiment or an embodiment containing both hardware and software elements. In an illustrative embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system. For the purposes of this description, a computer-usable or computer readable medium may be any tangible apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The illustrative embodiments described herein provide a computer-implemented method, apparatus, and a system for managing instructions. A load/store unit receives a first instruction at a port. The load/store unit determines a first condition of the first instruction. Then, in response to a first determination that the first condition is a first reject class condition, the load/store unit rejects the first instruction. Then, the instruction sequencing unit activates a first bit in response to the load/store unit rejecting the first instruction. While the first bit is activated, the first instruction is blocked from reissue.

Next, the instruction sequencing unit starts a counter in response to the load/store unit rejecting the first instruction. Then, the instruction sequencing unit determines whether the counter is expired. The instruction sequencing unit resets the first bit in response to the counter expiring. Afterwards, the instruction sequencing unit allows the first instruction to become eligible for reissue in response to resetting the first bit.

What is claimed is:

1. A method for managing instructions, the method comprising:
    receiving a first instruction at a port;
    responsive to determining, by a load/store unit in a processor unit, that the first instruction has a first reject condition, rejecting the first instruction;
    responsive to rejecting the first instruction, activating a first bit, wherein the first instruction is blocked from reissue while the first bit is activated;
    determining, by the processor unit, a class of rejection of the first instruction;
    starting a timer, wherein a length of the timer is set based on the class of rejection of the first instruction, wherein the timer is associated with the class of rejection of the first instruction;
    receiving a second instruction at the port;
    responsive to determining, by the load/store unit in the processor unit, that the second instruction has a second reject condition, rejecting the second instruction;
    responsive to rejecting the second instruction, activating a second bit, wherein the second instruction is blocked from reissue while the second bit is activated;
    responsive to the timer expiring, resetting the first bit;
    responsive to the timer expiring and the class of rejection of the first instruction and a class of rejection of second instruction are the same, resetting the second bit; and
    responsive to resetting the first bit and the second bit, allowing the first instruction and the second instruction to become eligible for reissue.

2. The method of claim 1, wherein receiving the first instruction is performed by the load/store unit in the processor unit, wherein rejecting the first instruction is performed by the load/store unit in the processor unit, and wherein activating the first bit is performed by an instruction sequencing unit in the processor unit.

3. The method of claim 1, further comprising:
    determining, by the processor unit, a class of rejection of the first instruction;
    starting a timer, wherein a length of the timer is set based on the class of rejection of the first instruction;
    responsive to the timer expiring, resetting the first bit; and
    responsive to resetting the first bit, allowing the first instruction to become eligible for reissue.

4. The method of claim 3, wherein starting a timer is performed by an instruction sequencing unit, wherein resetting the first bit is performed by the instruction sequencing unit, wherein the timer is a counter, and wherein the counter is programmable to count a number clock cycles.

5. The method of claim 3, wherein the class of rejection is based on an amount of time the load/store unit usually requires to be ready to accept the first instruction, wherein the amount of time is based on a type of condition of the first reject condition.

6. The method of claim 1, wherein receiving the second instruction is performed by the load/store unit, wherein rejecting the second instruction is performed by the load/store unit, and wherein activating the second bit is performed by an instruction sequencing unit.

7. The method of claim 1, wherein starting a timer is performed by an instruction sequencing unit, wherein resetting the first bit and the second bit is performed by the instruction sequencing unit, and wherein allowing the first bit and the second bit to become eligible for reissue is performed by the instruction sequencing unit, wherein the timer is a counter, and wherein the counter is programmable to count a number of clock cycles.

8. The method of claim 1, wherein the class of rejection is based on an amount of time a load/store unit usually required to be ready to accept the first instruction, wherein the amount of time is based on a type of condition of the second reject condition.

9. A data processing system comprising:
a bus;
a processor unit having a load/store unit and instruction sequencing unit connected to the bus, wherein the load/store unit receives a first instruction from the instruction sequencing unit at a port, wherein the processor unit rejects the first instruction in response to determining that the first instruction has a first reject condition, wherein the instruction sequencing unit activates a first bit in response to the load/store unit rejecting the first instruction, and wherein the first instruction is blocked from reissue while the first bit is activated; wherein the processor unit determines a class of rejection of the first instruction; wherein the processor unit starts a timer, wherein a length of the timer is set based on the class of rejection of the first instruction, wherein the timer is associated with the class of rejection of the first instruction; wherein the load/store unit receives a second instruction at the port; responsive to determining, by the load/store unit in the processor unit, that the second instruction has a second reject condition, the load/store unit rejecting the second instruction; responsive to rejecting the second instruction, the instruction sequencing unit activating a second bit, wherein the second instruction is blocked from reissue while the second bit is activated; responsive to the timer expiring, the instruction sequencing unit resetting the first bit; responsive to the timer expiring and the class of rejection of the first instruction and a class of rejection of second instruction are the same, the instruction sequencing unit resetting the second bit; and responsive to resetting the first bit and the second bit, the instruction sequencing unit allowing the first instruction and the second instruction to become eligible for reissue; and
a memory connected to the bus, wherein the memory stores instructions coming to the processor unit and from the processor unit.

10. A processor unit comprising:
a load/store unit, wherein the load/store unit receives a first instruction at a port, wherein the load/store unit rejects the first instruction in response to determining that the first instruction has a first reject condition; and
an instruction sequencing unit, wherein the instruction sequencing unit contains an issue queue, wherein the issue queue activates a first bit in response to the load/store unit rejecting the first instruction, and wherein the first instruction is blocked from reissue while the first bit is activated, wherein the instruction sequencing unit determines a class of rejection of the first instruction, wherein the instruction sequencing unit starts a timer, wherein a length of the timer is set based on the class of rejection of the first instruction, wherein the load/store unit receives a second instruction at the port, wherein the load/store unit determines a second condition of the second instruction, wherein the load/store unit rejects the second instruction in response to a second determination that the second condition is a second reject class condition, wherein the issue queue activates a second bit in response to the load/store unit rejecting the second instruction, and wherein the second instruction is blocked from reissue while the second bit is activated, wherein the instruction sequencing unit resets the first bit and the second bit in response to the timer expiring, and wherein the instruction sequencing unit allows the first instruction and the second instruction to become eligible for reissue in response to resetting the first bit and the second bit.

11. The processor unit of claim 10, wherein the instruction sequencing unit determines a class of rejection of the first instruction, wherein the instruction sequencing unit starts a timer, wherein a length of the timer is set based on the class of rejection of the first instruction, wherein the instruction sequencing unit resets the first bit in response to the timer expiring, and wherein the instruction sequencing unit allows the first instruction to become eligible for reissue in response to resetting the first bit.

12. The processor unit of claim 11, wherein the timer is a counter, and wherein the counter is programmable to count a number of clock cycles.

13. The processor unit of claim 10, wherein the timer is a counter, and wherein the counter is programmable to count a number of clock cycles.

* * * * *